United States Patent
Kunze et al.

(10) Patent No.: US 10,607,094 B2
(45) Date of Patent: Mar. 31, 2020

(54) VEHICLE VISION SYSTEM WITH TRAFFIC SIGN RECOGNITION

(71) Applicant: MAGNA ELECTRONICS INC., Auburn Hills, MI (US)

(72) Inventors: Norbert Kunze, Diez (DE); Harjeet Singh, Aschaffenburg (DE)

(73) Assignee: MAGNA ELECTRONICS INC., Auburn Hills, MI (US)

(*) Notice: Subject to any disclaimer, the term of this patent is extended or adjusted under 35 U.S.C. 154(b) by 236 days.

(21) Appl. No.: 15/888,803

(22) Filed: Feb. 5, 2018

(65) Prior Publication Data

US 2018/0225530 A1    Aug. 9, 2018

Related U.S. Application Data

(60) Provisional application No. 62/455,112, filed on Feb. 6, 2017.

(51) Int. Cl.
*G06K 9/00* (2006.01)
*G06K 9/78* (2006.01)
*G06K 9/20* (2006.01)

(52) U.S. Cl.
CPC ..... *G06K 9/00818* (2013.01); *G06K 9/00798* (2013.01); *G06K 9/209* (2013.01); *G06K 9/78* (2013.01)

(58) Field of Classification Search
None
See application file for complete search history.

(56) References Cited

U.S. PATENT DOCUMENTS

| | | |
|---|---|---|
| 5,539,397 A | 7/1996 | Asanuma et al. |
| 5,541,590 A | 7/1996 | Nishio |
| 5,550,677 A | 8/1996 | Schofield et al. |
| 5,555,555 A | 9/1996 | Sato et al. |
| 5,670,935 A | 9/1997 | Schofield et al. |
| 5,737,226 A | 4/1998 | Olson et al. |
| 5,760,962 A | 6/1998 | Schofield et al. |
| 5,765,118 A | 6/1998 | Fukatani |
| 5,781,437 A | 7/1998 | Wiemer et al. |

(Continued)

OTHER PUBLICATIONS

Aharon et al., "K-SVD: An Algorithm for Designing Overcomplete Dictionaries for Sparse Representation," IEEE Transactions on Signal Processing, vol. 54, No. 11, Nov. 2006.

(Continued)

*Primary Examiner* — Anand P Bhatnagar
(74) *Attorney, Agent, or Firm* — Honigman LLP

(57) ABSTRACT

A vision system for a vehicle includes a camera and a control. The control determines information on traffic signs and determines whether an indicated speed limit is for the lane being traveled by the vehicle. The vision system determines whether the indicated speed limit is for the lane being traveled by the vehicle responsive to a determination that the sign is at the left side of the lane and has an indicator representative of the right side of the lane and leaves the field of view at its left side, determination that the sign is at the right side of the lane and has an indicator representative of the left side of the lane and leaves the field of view at its right side, or determination of a speed limit sign at both sides of the road being traveled by the vehicle with both signs indicating the same speed limit.

20 Claims, 5 Drawing Sheets

(56) References Cited

U.S. PATENT DOCUMENTS

| | | |
|---|---|---|
| 5,786,772 A | 7/1998 | Schofield et al. |
| 5,793,420 A | 8/1998 | Schmidt |
| 5,796,094 A | 8/1998 | Schofield et al. |
| 5,877,897 A | 3/1999 | Schofield et al. |
| 5,878,370 A | 3/1999 | Olson |
| 5,883,739 A | 3/1999 | Ashihara et al. |
| 5,884,212 A | 3/1999 | Lion |
| 5,890,021 A | 3/1999 | Onoda |
| 5,896,085 A | 4/1999 | Mori et al. |
| 5,899,956 A | 5/1999 | Chan |
| 5,915,800 A | 6/1999 | Hiwatashi et al. |
| 5,923,027 A | 7/1999 | Stam et al. |
| 5,924,212 A | 7/1999 | Domanski |
| 5,929,786 A | 7/1999 | Schofield et al. |
| 5,949,331 A | 9/1999 | Schofield et al. |
| 5,959,555 A | 9/1999 | Furuta |
| 6,201,642 B1 | 3/2001 | Bos |
| 6,223,114 B1 | 4/2001 | Boros et al. |
| 6,266,082 B1 | 7/2001 | Yonezawa et al. |
| 6,266,442 B1 | 7/2001 | Laumeyer et al. |
| 6,285,393 B1 | 9/2001 | Shimoura et al. |
| 6,302,545 B1 | 10/2001 | Schofield et al. |
| 6,370,329 B1 | 4/2002 | Teuchert |
| 6,392,315 B1 | 5/2002 | Jones et al. |
| 6,396,397 B1 | 5/2002 | Bos et al. |
| 6,477,464 B2 | 11/2002 | McCarthy et al. |
| 6,498,620 B2 | 12/2002 | Schofield et al. |
| 6,523,964 B2 | 2/2003 | Schofield et al. |
| 6,553,130 B1 | 4/2003 | Lemelson et al. |
| 6,611,202 B2 | 8/2003 | Schofield et al. |
| 6,636,258 B2 | 10/2003 | Strumolo |
| 6,690,268 B2 | 2/2004 | Schofield et al. |
| 6,704,621 B1 | 3/2004 | Stein et al. |
| 6,711,474 B1 | 3/2004 | Treyz et al. |
| 6,735,506 B2 | 5/2004 | Breed et al. |
| 6,744,353 B2 | 6/2004 | Sjonell |
| 6,795,221 B1 | 9/2004 | Urey |
| 6,802,617 B2 | 10/2004 | Schofield et al. |
| 6,806,452 B2 | 10/2004 | Bos et al. |
| 6,822,563 B2 | 11/2004 | Bos et al. |
| 6,891,563 B2 | 5/2005 | Schofield et al. |
| 6,946,978 B2 | 9/2005 | Schofield |
| 7,005,974 B2 | 2/2006 | McMahon et al. |
| 7,038,577 B2 | 5/2006 | Pawlicki et al. |
| 7,058,206 B1 | 6/2006 | Janssen et al. |
| 7,062,300 B1 | 6/2006 | Kim |
| 7,065,432 B2 | 6/2006 | Moisel et al. |
| 7,075,427 B1 * | 7/2006 | Pace .................. B61L 23/06 |
| | | 246/125 |
| 7,079,017 B2 | 7/2006 | Lang et al. |
| 7,136,753 B2 | 11/2006 | Samukawa et al. |
| 7,145,519 B2 | 12/2006 | Takahashi et al. |
| 7,202,776 B2 | 4/2007 | Breed |
| 7,230,640 B2 | 6/2007 | Regensburger et al. |
| 7,248,283 B2 | 7/2007 | Takagi et al. |
| 7,295,229 B2 | 11/2007 | Kumata et al. |
| 7,301,466 B2 | 11/2007 | Asai |
| 7,490,007 B2 | 2/2009 | Taylor et al. |
| 7,526,103 B2 | 4/2009 | Schofield et al. |
| 7,592,928 B2 | 9/2009 | Chinomi et al. |
| 7,681,960 B2 | 3/2010 | Wanke et al. |
| 7,720,580 B2 | 5/2010 | Higgins-Luthman |
| 7,724,962 B2 | 5/2010 | Zhu et al. |
| 7,855,755 B2 | 12/2010 | Weller et al. |
| 7,859,565 B2 | 12/2010 | Schofield et al. |
| 7,881,496 B2 | 2/2011 | Camilleri et al. |
| 7,952,490 B2 | 5/2011 | Fechner et al. |
| 7,972,045 B2 | 7/2011 | Schofield |
| 8,013,780 B2 | 9/2011 | Lynam |
| 8,027,029 B2 | 9/2011 | Lu et al. |
| 8,376,595 B2 | 2/2013 | Higgins-Luthman |
| 8,849,495 B2 | 9/2014 | Chundrik, Jr. et al. |
| 9,187,028 B2 | 11/2015 | Higgins-Luthman |
| 9,195,914 B2 * | 11/2015 | Fairfield .................. G06K 9/78 |
| 9,280,560 B1 | 3/2016 | Dube et al. |
| 9,428,192 B2 | 8/2016 | Schofield et al. |
| 9,460,355 B2 * | 10/2016 | Stenneth .................. G06K 9/72 |
| 9,489,586 B2 * | 11/2016 | Chung .............. G06K 9/00818 |
| 9,508,014 B2 | 11/2016 | Lu et al. |
| 9,626,865 B2 * | 4/2017 | Yokochi ............. G06K 9/00818 |
| 9,697,430 B2 * | 7/2017 | Kristensen ......... G06K 9/00818 |
| 10,046,764 B2 * | 8/2018 | Masuda ............. G06K 9/00818 |
| 10,089,870 B2 * | 10/2018 | Ro ..................... G06K 9/00818 |
| 10,127,466 B2 * | 11/2018 | Stenneth .................. G06K 9/72 |
| 10,377,309 B2 * | 8/2019 | Lee .................... G06K 9/00798 |
| 10,423,843 B2 | 9/2019 | Biemer et al. |
| 10,475,338 B1 * | 11/2019 | Noel .................... G08G 1/0133 |
| 2002/0015153 A1 | 2/2002 | Downs |
| 2002/0113873 A1 | 8/2002 | Williams |
| 2003/0108252 A1 | 6/2003 | Carrig |
| 2003/0137586 A1 | 7/2003 | Lewellen |
| 2003/0202683 A1 | 10/2003 | Ma et al. |
| 2003/0222982 A1 | 12/2003 | Hamdan et al. |
| 2004/0010352 A1 | 1/2004 | Stromme |
| 2004/0114381 A1 | 6/2004 | Salmeen et al. |
| 2006/0103727 A1 | 5/2006 | Tseng |
| 2006/0164221 A1 | 7/2006 | Jensen |
| 2006/0250501 A1 | 11/2006 | Wildmann et al. |
| 2006/0290479 A1 | 12/2006 | Akatsulca et al. |
| 2007/0104476 A1 | 5/2007 | Yasutomi et al. |
| 2008/0231710 A1 | 9/2008 | Asari et al. |
| 2009/0093938 A1 | 4/2009 | Isaji et al. |
| 2009/0113509 A1 | 4/2009 | Tseng et al. |
| 2009/0144311 A1 | 6/2009 | Stratis et al. |
| 2009/0177347 A1 | 7/2009 | Breuer et al. |
| 2009/0243824 A1 | 10/2009 | Peterson et al. |
| 2009/0244361 A1 | 10/2009 | Gebauer et al. |
| 2009/0265069 A1 | 10/2009 | Desbrunes |
| 2010/0067805 A1 | 3/2010 | Klefenz |
| 2010/0228437 A1 | 9/2010 | Hanzawa et al. |
| 2010/0283855 A1 | 11/2010 | Becker |
| 2012/0044066 A1 | 2/2012 | Mauderer et al. |
| 2012/0218412 A1 | 8/2012 | Dellantoni et al. |
| 2012/0262340 A1 | 10/2012 | Hassan et al. |
| 2012/0310968 A1 | 12/2012 | Tseng |
| 2013/0116859 A1 | 5/2013 | Ihlenburg et al. |
| 2013/0124052 A1 | 5/2013 | Hahne |
| 2013/0129150 A1 | 5/2013 | Saito |
| 2013/0131918 A1 | 5/2013 | Hahne |
| 2013/0191003 A1 | 7/2013 | Hahne et al. |
| 2013/0278769 A1 | 10/2013 | Nix et al. |
| 2014/0003709 A1 * | 1/2014 | Ranganathan ..... G06K 9/00798 |
| | | 382/159 |
| 2014/0067206 A1 | 3/2014 | Pflug |
| 2014/0156157 A1 | 6/2014 | Johnson et al. |
| 2014/0227780 A1 | 8/2014 | Salomonsson et al. |
| 2014/0236477 A1 | 8/2014 | Chen et al. |
| 2014/0313339 A1 | 10/2014 | Diessner |
| 2014/0327772 A1 | 11/2014 | Sahba |
| 2014/0340510 A1 | 11/2014 | Ihlenburg et al. |
| 2014/0379233 A1 | 12/2014 | Chundrlik, Jr. et al. |
| 2015/0124096 A1 | 5/2015 | Koravadi |
| 2015/0248771 A1 * | 9/2015 | Kim .......................... G06T 7/12 |
| | | 382/169 |
| 2015/0302747 A1 * | 10/2015 | Ro .................... G08G 1/096783 |
| | | 340/905 |
| 2016/0034769 A1 | 2/2016 | Singh |
| 2016/0092755 A1 * | 3/2016 | Fairfield .................. G06K 9/78 |
| | | 701/28 |
| 2016/0104049 A1 * | 4/2016 | Stenneth .................. G06K 9/72 |
| | | 382/155 |
| 2016/0117562 A1 * | 4/2016 | Chung .............. G06K 9/00818 |
| | | 382/104 |
| 2016/0210853 A1 | 7/2016 | Koravadi |
| 2016/0362050 A1 * | 12/2016 | Lee .................... G06K 9/00805 |
| 2016/0379068 A1 * | 12/2016 | Stenneth .................. G06K 9/72 |
| | | 382/159 |
| 2017/0017849 A1 * | 1/2017 | Kristensen ......... G06K 9/00818 |
| 2017/0148320 A1 * | 5/2017 | Ro ..................... G06K 9/00818 |
| 2018/0120857 A1 * | 5/2018 | Kappauf ............... G01C 21/32 |

(56) References Cited

U.S. PATENT DOCUMENTS

2018/0225530 A1    8/2018   Kunze et al.
2018/0239972 A1    8/2018   Biemer et al.

OTHER PUBLICATIONS

He et al., "Deep Residual Learning for Image Recognition", Computer Vision Foundation, pp. 770-778.
Ledig, "Photo-Realistic Single Image Super-Resolution Using a Generative Adversarial Network," arXiv:1609.04802v3 [cs.CV] Nov. 21, 2016, pp. 1-19.
Van den Oord et al., "Pixel Recurrent Neural Networks," aparXiv: 1601.06759v3 [cs.CV] Aug. 19, 2016, pp. 1-11.
Yu, "Ultra-Resolving Face Images by Discriminative Generative Networks," Australian National University, European Conference on Computer Vision, 2016.

\* cited by examiner

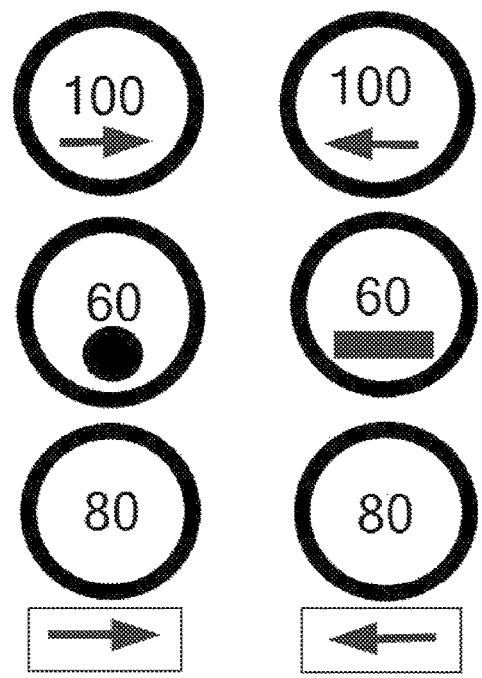
FIG. 4
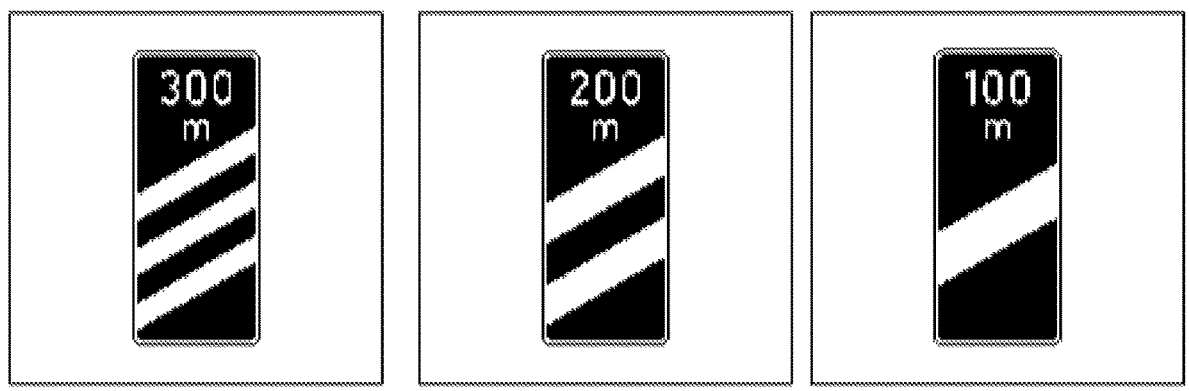
Motorway marker (300m before exit)
FIG. 5A
Motorway marker (200m before exit)
FIG. 5B
Motorway marker (100m before exit)
FIG. 5C

VEHICLE VISION SYSTEM WITH TRAFFIC SIGN RECOGNITION

CROSS REFERENCE TO RELATED APPLICATION

The present application claims the filing benefits of U.S. provisional application Ser. No. 62/455,112, filed Feb. 6, 2017, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a driver assistance system or vision system or imaging system for a vehicle that utilizes one or more cameras (preferably one or more CMOS cameras) to capture image data representative of images exterior of the vehicle, and determines traffic signs present along the road being traveled by the vehicle and in the field of view of the camera. The system is operable to determine a speed limit on one or more traffic signs and determines whether the detected sign is providing a speed limit for the particular lane in which the vehicle is traveling. The system, responsive to image processing of image data captured by the camera, determines valid signs and determines and ignores invalid signs.

These and other objects, advantages, purposes and features of the present invention will become apparent upon review of the following specification in conjunction with the drawings.

BRIEF DESCRIPTION OF THE DRAWINGS

FIG. 4 shows various speed limit signs that provide directional information as to which lane the particular sign is valid;

FIGS. 5A-C show signs that indicate the distance to an exit road that exits the road along which the signs are located.

Figure 1:
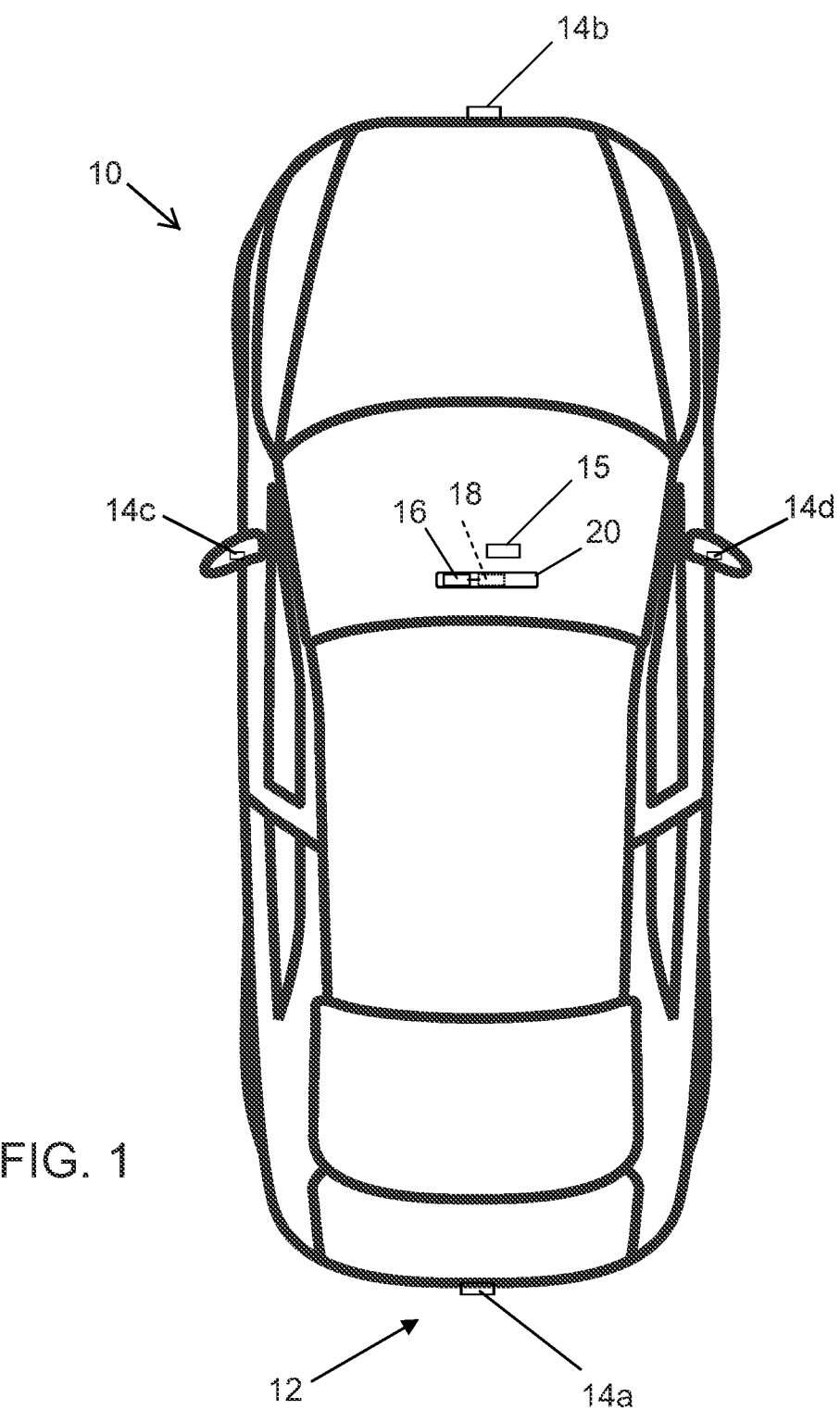
FIG. 1 is a plan view of a vehicle with a vision system that incorporates cameras in accordance with the present invention.

LEGEND 1 lane 1
2 lane 2
3 lane 3
4 lane 4
5 exit lane to the right
6 Traffic signs for speed limitation valid for exit lane
7 Traffic signs for speed limitation valid for lanes 3 and 4
8 Traffic signs for speed limitation valid for lanes 1 and 2
9 lanes in counter direction
30 front camera in vehicle in position A
31 front camera in vehicle in position B
21, 22 view angle of camera
23 Truck hampering free view on right sign (8)
15 ego vehicle's forward directed camera
10 ego vehicle
18 Control for Traffic Sign Recognition (TSR)
40 Motorway exit marker 100 m
41 Motorway exit marker 200 m

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Referring now to the drawings and the illustrative embodiments depicted therein, a vehicle 10 includes an imaging system or vision system 12 that includes at least one exterior viewing imaging sensor or camera, such as a rearward viewing imaging sensor or camera 14a (and the system may optionally include multiple exterior viewing imaging sensors or cameras, such as a forward viewing camera 14b at the front (or at the windshield) of the vehicle, and a sideward/rearward viewing camera 14c, 14d at respective sides of the vehicle), which captures images exterior of the vehicle, with the camera having a lens for focusing images at or onto an imaging array or imaging plane or imager of the camera (FIG. 1). In the illustrated embodiment, a forward viewing camera 15 is disposed at the windshield of the vehicle and views through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) or processor 18 (such as a traffic sign recognition control or unit or system) that is operable to process image data captured by the camera or cameras and may detect objects or the like and/or provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Existing traffic sign recognition (TSR) systems may fail to dedicate the validity to an according lane, when it comes to traffic situations where adjacent lanes divided by lane dividers have different speed limits, indicated by speed limit signs which are visible from both adjacent lanes. Some advanced TSR systems solve that problem by taking navigation system's map data into context. These systems run a plausibility check to determine whether a traffic sign at a certain vehicle position is plausible to the actual used lane or must be cleared or corrected. The lacking of these systems is that the navigation's map and its according lane plausibility must be accurate at all times. A vehicle buyer tends to not keep the GPS system maps updated out of convenience and cost reasons. Other advanced TSR systems solve the problem by only adapting speed limits when the speed limit signs are acknowledged both on the left and the right side of the vehicle. These systems fail at times the ego or subject or equipped vehicle passes a speed limit entry with one (or both) speed limit sign visible while the other one is not visible (not viewed or captured by the vision system camera), due to, for example, a blockage. The blockage may comprise, for example, a traffic participant or other object, or may be caused by snow or the like that is covering or partially covering the traffic sign.

Figure 2:
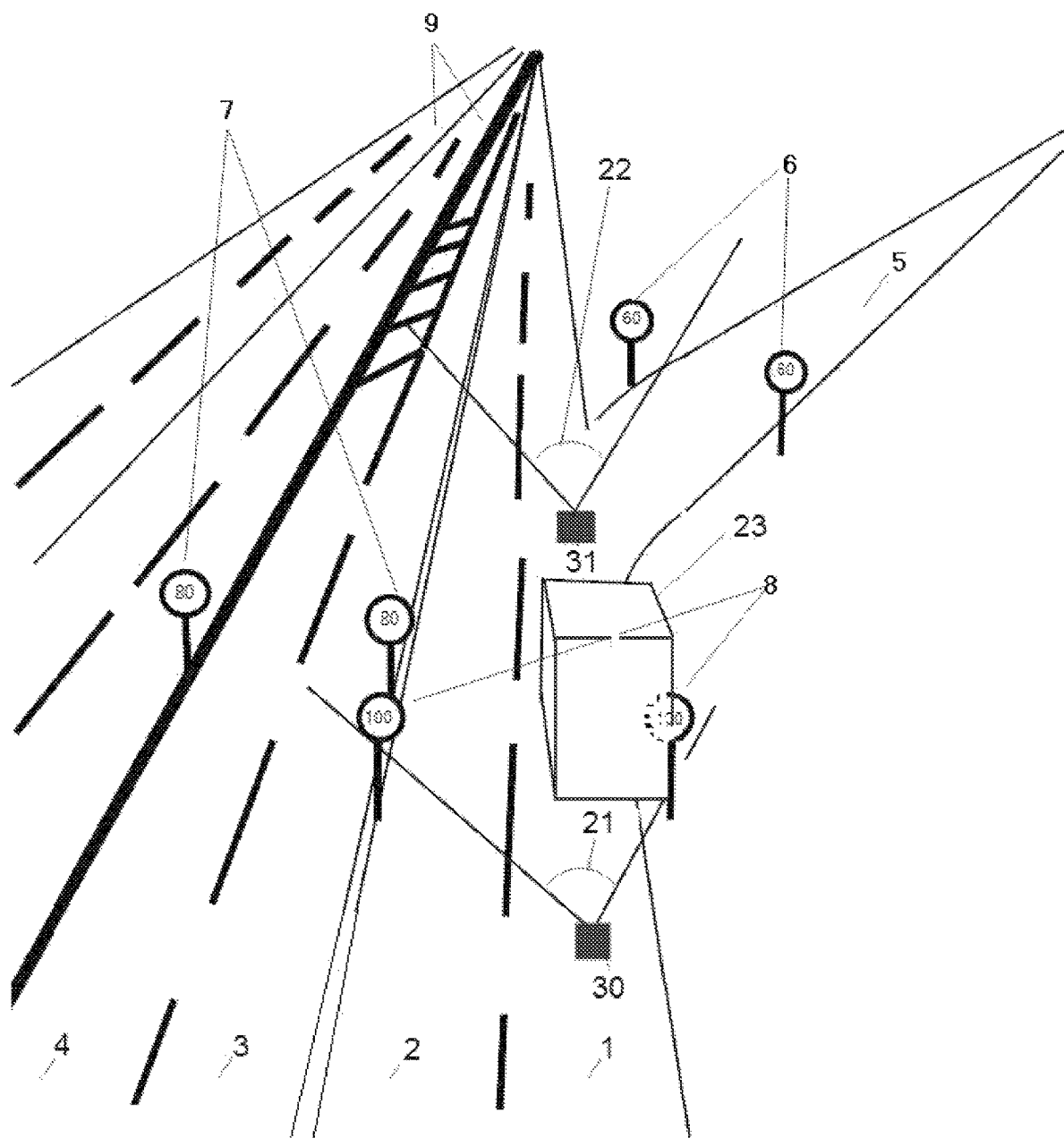
FIG. 2 is a perspective view of a road and speed limit signs scenario.

With reference to FIG. 2, the subject vehicle is shown (at two positions 30 and 31) traveling along a road or street in lane 1. At lane 1, 30 meters ahead of the subject vehicle at position 30, a truck 23 is driving. The subject vehicle is at or approaching position 30. There is one 100 km/h speed limit sign 8 at the left of lane 2 (adjacent to lane 1 and with same direction traffic) and there is one 100 km/h speed limit sign 8 at the right of lane 1. Due to the truck blocking the direct view of the subject vehicle front camera (such as a windshield mounted camera 15 in FIG. 1) towards the speed limit sign to the right of lane 1, a conventional traffic sign recognition (TSR) system fails to adopt the speed limit (according to the signs at lane 1 and 2) when the system is made to adopt speed limits when detecting both a sign left and right of the vehicle.

At lanes 3 and 4, a speed limit of 80 km/h is beginning, indicated by two 80 km/h speed limit traffic signs 7 at the left of lane 4 and at the right of lane 3. A conventional TSR system fails to ignore the 80 km/h speed limit (dedicated to the lane 3 and 4) when the system is made to adopt speed limits when detecting just one sign at left or the right of the vehicle.

Also, existing traffic sign recognition (TSR) systems often fail to ignore speed limits dedicated to exit lanes (such as lane 5 in FIG. 2) when the subject vehicle is not following these exit lanes. Additionally, nowadays TSR systems do not take motorway exit marker signs, such as shown in FIGS. 5A, 5B and 5C, into account for doing a plausibility check and prediction where an exit starts.

With reference to the exemplary traffic situation shown in FIG. 2, the subject vehicle at location 31 is traveling along lane 1 and passing a street or exit lane 5. The speed limit for the straight traffic (lane 1) is 100 km/h, indicated by one 100 km/h speed limit sign at the left side of lane 2 and the right of lane 1. A consecutive lane exit to the right has a speed limit of 60 km/h, indicated by a 60 km/h speed limit sign on the left and 60 km/h speed limit sign the right of the exit lane 5. Thus, the valid traffic sign at the left side of the exit lane is placed very narrow to the beginning of the fork and will be captured by the subject vehicle front camera. Common TSR systems usually adopt the speed limit indicated for the exit lane without doing a plausible check as to which lane will be taken by the driver later, or alternatively which lane is planned to take by the navigation system (instantaneously), displaying the wrong speed limit to the driver (or reducing the vehicle speed automatically, when automated speed adaption is implemented).

In situations where two traffic signs showing identical signs (for example, identical speed limits) that are captured (sensed) enclose a lane or multiple lanes by being positioned at the left and right sides of the road, the system may handle this as one speed limit dedicated to that lane or those lanes. In situations where both traffic signs leave the camera's field of view at the right and the subject vehicle has not passed that lane but has followed another lane (to the left), that speed limit may be ignored and the previously determined speed limit may be reestablished as valid. Optionally, the tracking of the lane may be responsive to the vehicle navigation system's data or processing and/or the vehicle lane detection system's data or processing and scene classification data, where the data may be used in fusion with the image data captured by the forward viewing camera 15 (or alternatively) for dedicating which lane the subject vehicle is following for deciding which indicated traffic signs are actually valid. Optionally, the detection of lane dividers may be taken into account as an indication that a speed limit may be indicated different at the adjacent lane or lanes.

Figure 6:
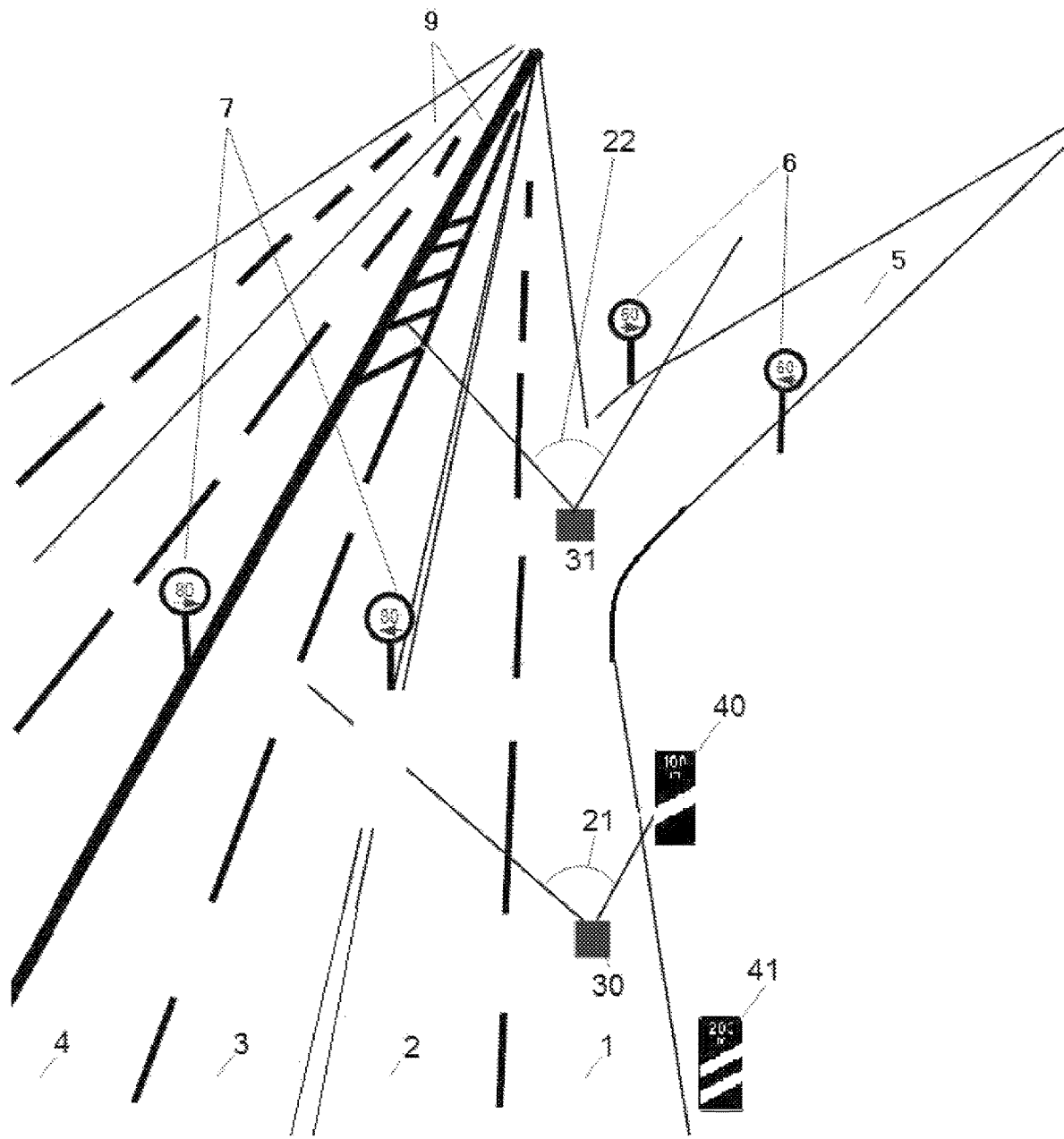
FIG. 6 is a perspective view of another road and speed limit signs scenario.

Optionally, the TSR system may also detect and classify (recognize) motorway exit marker signs, such as shown in FIGS. 5A, 5B and 5C. Optionally, the position of these signs may find use to dedicate the distance where an exit lane may start or whether it may be plausible to detect one. Optionally, that information may be used to do a plausibility check as to whether road signs are dedicated to an exit lane or lanes or not. An example of a scene with motorway exit marker signs 40 (indicating the distance to the beginning of an exit lane) is shown in FIG. 6. In such a situation, the system may detect the exit marker signs 40 and then, when the system knows the vehicle is at or near the exit (responsive to processing of the detected exit marker signs), the system may readily ignore reduced speed limit signs that are more likely to be at the exit lane when the vehicle is not exiting.

Optionally, an artificial intelligence (AI) algorithm may be trained to fuse the visual cues and the dedicated plausibility logic and optionally may fuse additional sensors and remote street and traffic data systems' cues to it. The remote street and traffic data systems may be connected via any kind of vehicle to infrastructure (V2X) communication system, such as via a LTE connection or the like.

Figure 3:
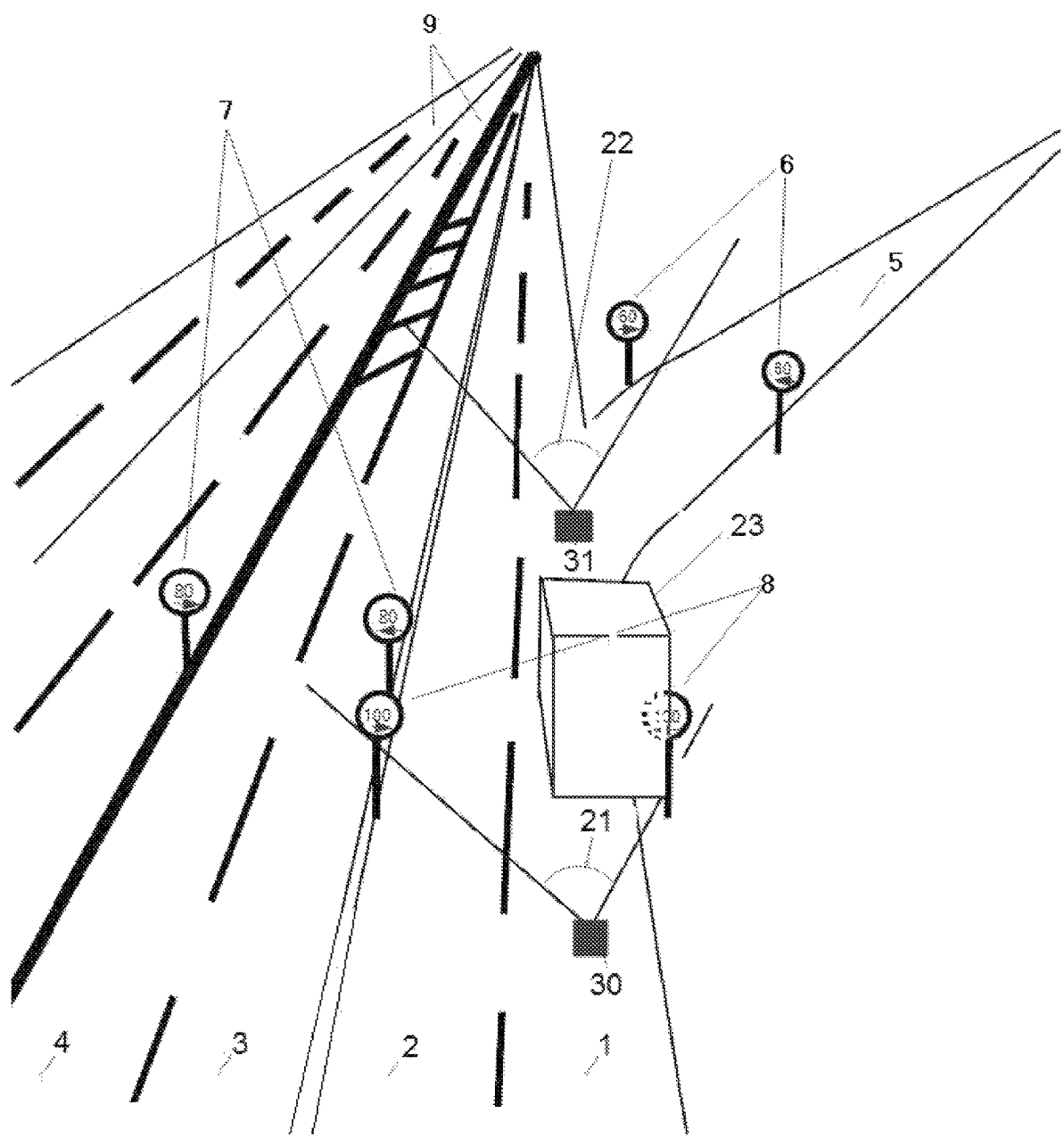
FIG. 3 is a perspective view of another road and speed limit signs scenario.

As shown in FIG. 3, traffic signs for speed limitation may possess an indicator that defines which side of the lane the sign is valid. The vehicle TSR system with a forward viewing camera may be operable to identify these indicators together with the shown (usual) traffic sign value (identical on both traffic signs), such as, for example, a speed limit. The indicator may be located on the sign's surface or at an additional sign nearby the speed limit sign (such as shown in FIG. 4). The indicator or identifier may be an arrow pointing in a specific direction or any suitable unique identifier or indicator for the left or right side. The indicator may point towards the road, lane or lanes enclosed by the two traffic signs. By that, the traffic sign left of the road, lane or lanes may point towards the right and the traffic sign right of the road, lane or lanes may point towards the left. By that, there will be always a pair of traffic signs having an arrow to the left and to the right. At times where one of the signs may be blocked by any reason (such as by the truck in FIG. 3), but one traffic sign with an arrow is visible by the TSR system, the traffic sign's according road, lane or lanes can still be determined (at least to the extent of the lane in which the subject vehicle is traveling).

With reference to FIG. 3, the subject vehicle is traveling along on lane 1 with valid speed limitation of 100 km/h. The vehicle's forward viewing camera captures and the system recognizes one of the 100 km/h signs at minimum, and also recognizes an indicator to the right side that leaves the camera view at its left side (or an indicator to the left side that leaves the camera view at its right side). The system may dedicate both signs as valid both in single appearance and in pairs.

If the vehicle is traveling along lane 4 and the left lane gets a speed limit of 80 km/h, the forward viewing camera will capture the sign image and the system will recognize that 80 km/h is valid for the left lane only because the traffic sign is at the left side, has an indicator for the right side, and leaves the imager at the left side. It does not matter whether a sign for 80 km/h at the right side of lane 4 may be covered, since clearly, the 80 km/h sign at the left side of the left lane 4 (with an indicator pointing to the right) is valid for traffic traveling along lane 4.

When the subject vehicle passes a street sign on lane 4 with a valid speed limit of 100 km/h, the forward viewing camera captures and the system recognizes at least one of the signs for 100 km/h, with an indicator for the left side that leaves the imager at its left side or an indicator for the right side that leaves the imager at its right side. Both signs are valid in a single appearance or in combination of both.

The subject vehicle may pass the fork or exit lane 5 or branching off road at the right side and recognizes the 60 km/h speed limit sign at the fork. In situations where only the left sign 6 is captured, it has an indicator for the left side and leaves the imager at its right side. Thus, the system will ignore this sign. In situations where both signs 6 are captured, both signs are ignored because they leave the imager at the right side and there is an indicator for the left side at one of them. The situation where only the right sign 6 is captured is avoided by the limitation of the view angle of the forward viewing camera when the vehicle is at location 31 (FIG. 3).

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

The system may also communicate with other systems, such as via a vehicle-to-vehicle communication system or a vehicle-to-infrastructure communication system or the like. Such car2car or vehicle to vehicle (V2V) and vehicle-toinfrastructure (car2X or V2X or V2I or a 4G or 5G broadband cellular network) technology provides for communication between vehicles and/or infrastructure based on information provided by one or more vehicles and/or information provided by a remote server or the like. Such vehicle communication systems may utilize aspects of the systems described in U.S. Pat. Nos. 6,690,268; 6,693,517 and/or 7,580,795, and/or U.S. Publication Nos. US-2014-0375476; US-2014-0218529; US-2013-0222592; US-2012-0218412; US-2012-0062743; US-2015-0251599; US-2015-0158499; US-2015-0124096; US-2015-0352953; US-2016-0036917 and/or US-2016-0210853, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,708,410; 5,737,226; 5,802,727; 5,878,370; 6,087,953; 6,173,501; 6,222,460; 6,513,252 and/or 6,642,851, and/or U.S. Publication Nos. US-2014-0022390; US-2012-0162427; US-2006-0050018 and/or US-2006-0061008, which are all hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vision system for a vehicle, said vision system comprising:
   a camera disposed at a vehicle so as to have a field of view forward of the vehicle;
   a control comprising an image processor operable to process image data captured by said camera;
   wherein said control, responsive to image processing by said image processor of image data captured by said camera, determines information on traffic signs present in the forward field of view of said camera;
   wherein said control, responsive to detection of at least one speed limit sign at a side of a road being traveled by the vehicle, determines, via image processing by said image processor of image data captured by said camera, whether the indicated speed limit is for the traffic lane being traveled by the vehicle; and
   wherein said vision system determines whether the indicated speed limit is for the traffic lane being traveled by the vehicle responsive to a determination selected from the group consisting of (i) determination that the speed limit sign is at the left side of the traffic lane being traveled by the vehicle and has an indicator representing the left side of the traffic lane and wherein the speed limit sign leaves the field of view at its left side, (ii) determination that the speed limit sign is at the right side of the traffic lane being traveled by the vehicle and has an indicator representing the right side of the traffic lane and wherein the speed limit sign leaves the field of view at its right side, and (iii) determination of a speed limit sign at both sides of the traffic lane being traveled by the vehicle with both speed limit signs indicating the same speed limit.

2. The vision system of claim 1, wherein said vision system determines whether the indicated speed limit is for the traffic lane being traveled by the vehicle responsive to a determination that the speed limit sign is at the left side of the traffic lane being traveled by the vehicle and has an indicator representing the left side of the traffic lane and wherein the speed limit sign leaves the field of view at its left side.

3. The vision system of claim 2, wherein the indicator representing the left side of the traffic lane comprises an arrow pointing toward the right.

4. The vision system of claim 2, wherein the indicator is disposed at any location on the speed limit sign or nearby the speed limit sign.

5. The vision system of claim 1, wherein said vision system determines whether the indicated speed limit is for the traffic lane being traveled by the vehicle responsive to a determination that the speed limit sign is at the right side of the traffic lane being traveled by the vehicle and has an indicator representing the right side of the traffic lane and wherein the speed limit sign leaves the field of view at its right side.

6. The vision system of claim 5, wherein the indicator representing the right side of the traffic lane comprises an arrow pointing toward the left.

7. The vision system of claim 5, wherein the indicator is disposed at any location on the speed limit sign or nearby the speed limit sign.

8. The vision system of claim 1, wherein said vision system determines whether the indicated speed limit is for the traffic lane being traveled by the vehicle responsive to a determination of a speed limit sign at both sides of the traffic lane being traveled by the vehicle with both speed limit signs indicating the same speed limit.

9. The vision system of claim 1, wherein said vision system ignores a determined speed limit sign responsive to determination that the determined speed limit sign is at the right side of the traffic lane being traveled by the vehicle and has an indicator representing the left side of the traffic lane.

10. The vision system of claim 1, wherein said vision system ignores a determined speed limit sign responsive to determination that the determined speed limit sign is at the left side of the traffic lane being traveled by the vehicle and has an indicator representing the right side of the traffic lane.

11. The vision system of claim 1, wherein said vision system ignores a determined speed limit sign responsive to determination that the determined speed limit sign is on a road branching off of the road being traveled by the vehicle.

12. The vision system of claim 11, wherein said vision system determines that the speed limit sign is on a road branching off of the road being traveled by the vehicle responsive to determination, via image processing by said image processor of image data captured by said camera, of exit signs ahead of the branching off road.

13. The vision system of claim 1, wherein said vision system determines valid and invalid speed limit signs responsive at least in part to a navigation system of the vehicle.

14. The vision system of claim 1, wherein said vision system determines valid and invalid speed limit signs responsive at least in part to a vehicle to infrastructure communication system.

15. The vision system of claim 1, wherein said vision system determines valid and invalid speed limit signs responsive at least in part to a lane detection system of the vehicle.

16. A vision system for a vehicle, said vision system comprising:

a camera disposed at a vehicle so as to have a field of view forward of the vehicle;

a control comprising an image processor operable to process image data captured by said camera;

wherein said control, responsive to image processing by said image processor of image data captured by said camera, determines information on traffic signs present in the forward field of view of said camera;

wherein said control, responsive to detection of at least one speed limit sign at a side of a road being traveled by the vehicle, determines, via image processing by said image processor of image data captured by said camera, whether the indicated speed limit is for the traffic lane being traveled by the vehicle;

wherein said vision system determines whether the indicated speed limit is for the traffic lane being traveled by the vehicle responsive to determination that the speed limit sign is at the right side of the traffic lane being traveled by the vehicle and has an indicator representing the right side of the traffic lane, and wherein the speed limit sign leaves the field of view at its right side;

wherein the indicator is disposed at any location on the speed limit sign or nearby the speed limit sign; and wherein said vision system ignores a determined speed limit sign responsive to determination that the determined speed limit sign is on a road branching off of the road being traveled by the vehicle.

17. The vision system of claim 16, wherein said vision system determines that the speed limit sign is on a road branching off of the road being traveled by the vehicle responsive to determination, via image processing by said image processor of image data captured by said camera, of exit signs ahead of the branching off road.

18. A vision system for a vehicle, said vision system comprising:

a camera disposed at a vehicle so as to have a field of view forward of the vehicle;

a control comprising an image processor operable to process image data captured by said camera;

wherein said control, responsive to image processing by said image processor of image data captured by said camera, determines information on traffic signs present in the forward field of view of said camera;

wherein said control, responsive to detection of at least one speed limit sign at a side of a road being traveled by the vehicle, determines, via image processing by said image processor of image data captured by said camera, whether the indicated speed limit is for the traffic lane being traveled by the vehicle;

wherein said vision system determines whether the indicated speed limit is for the traffic lane being traveled by the vehicle responsive to determination that the speed limit sign is at the right side of the traffic lane being traveled by the vehicle and has an indicator representing the right side of the traffic lane and wherein the speed limit sign leaves the field of view at its right side;

wherein the indicator is disposed at any location on the speed limit sign or nearby the speed limit sign; and wherein said vision system determines valid and invalid speed limit signs responsive at least in part to a navigation system of the vehicle.

19. The vision system of claim 18, wherein said vision system determines valid and invalid speed limit signs responsive at least in part to a vehicle to infrastructure communication system.

20. The vision system of claim 18, wherein said vision system determines valid and invalid speed limit signs responsive at least in part to a lane detection system of the vehicle.

* * * * *